H. T. COLDWELL.
SPEED CONTROLLING AND REVERSING APPARATUS FOR MOTOR VEHICLES.
APPLICATION FILED DEC. 24, 1907.
902,558.
Patented Nov. 3, 1908.
4 SHEETS—SHEET 2.
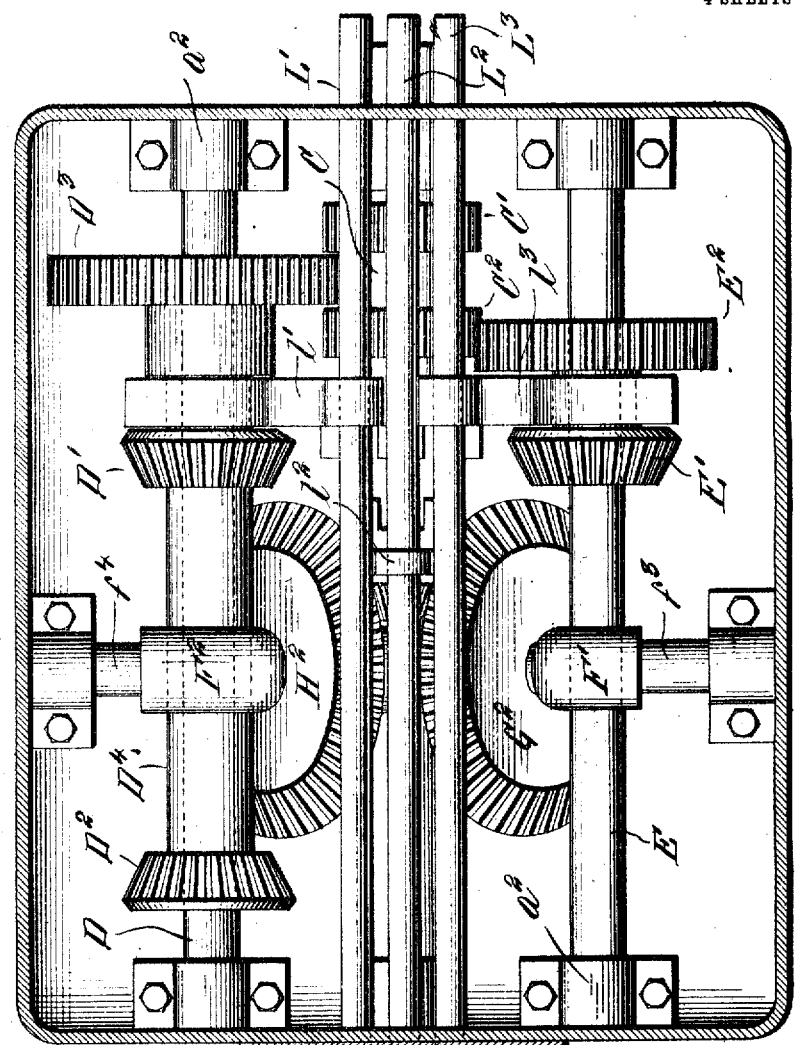

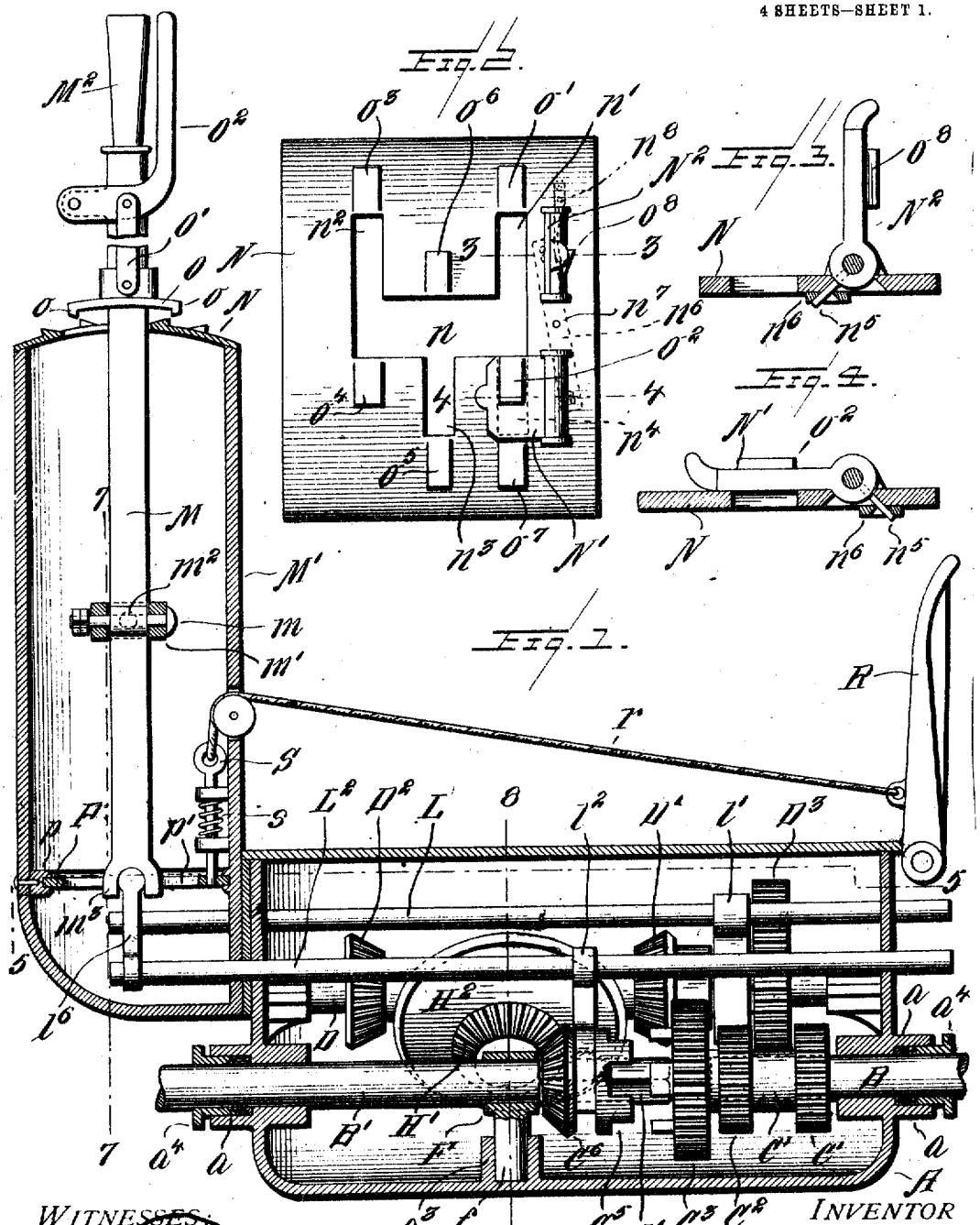

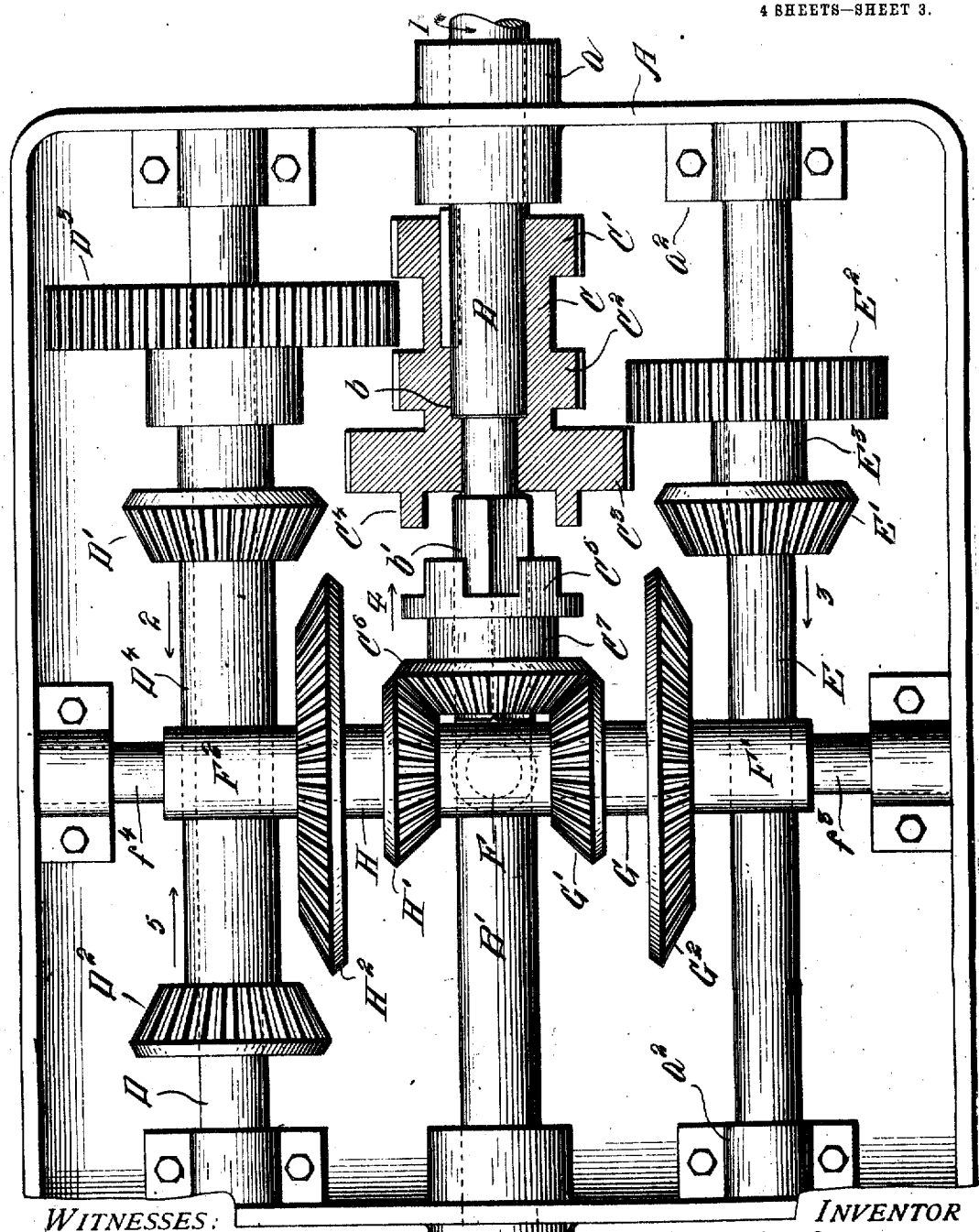

H. T. COLDWELL.
SPEED CONTROLLING AND REVERSING APPARATUS FOR MOTOR VEHICLES.
APPLICATION FILED DEC. 24, 1907.
902,558.
Patented Nov. 3, 1908.
4 SHEETS—SHEET 4.
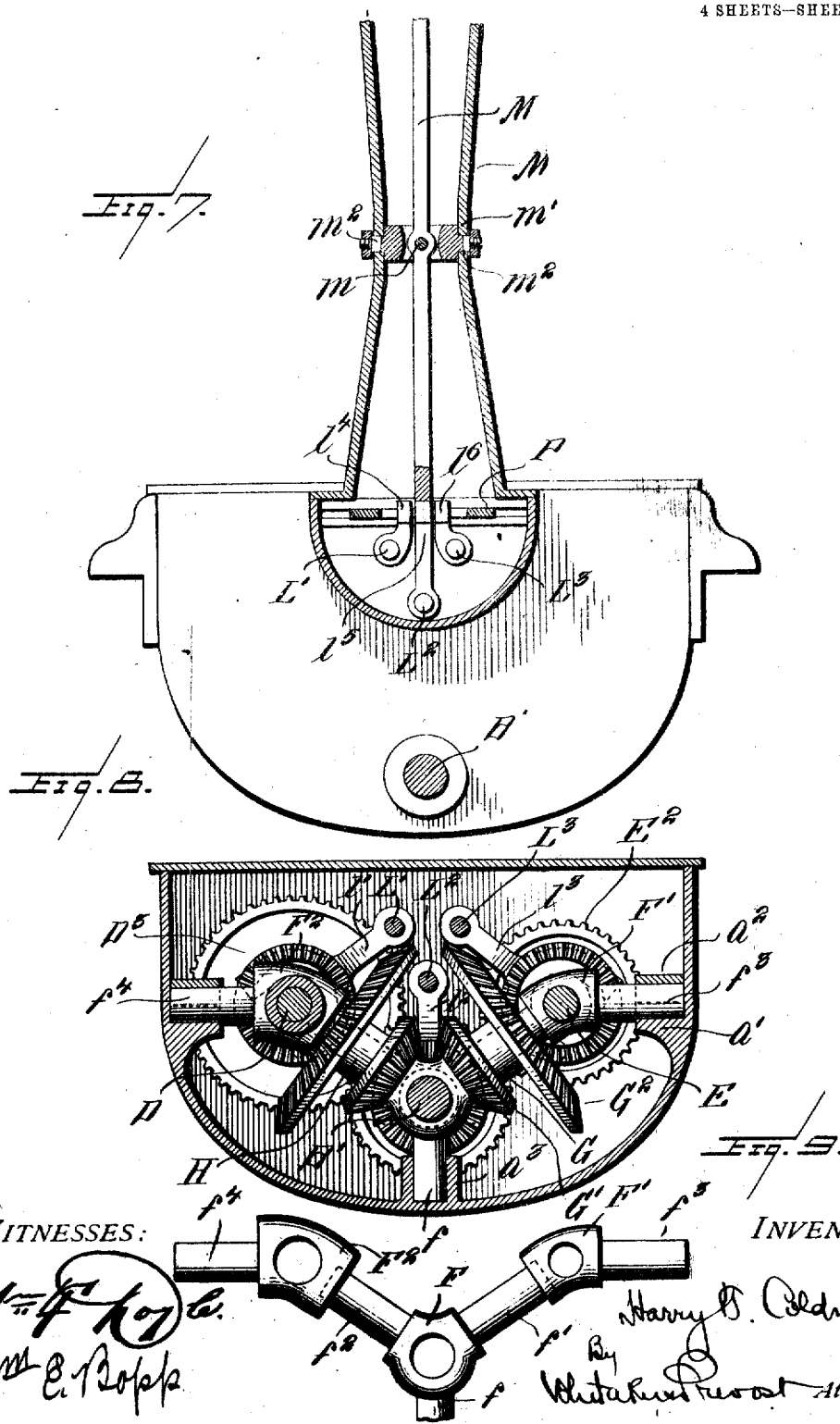

UNITED STATES PATENT OFFICE.

HARRY T. COLDWELL, OF NEWBURGH, NEW YORK.

SPEED-CONTROLLING AND REVERSING APPARATUS FOR MOTOR-VEHICLES.

No. 902,558.        Specification of Letters Patent.        Patented Nov. 3, 1908.

Application filed December 24, 1907. Serial No. 407,955.

*To all whom it may concern:*

Be it known that I, HARRY T. COLDWELL, a citizen of the United States, residing at Newburgh, in the county of Orange and State of New York, have invented certain new and useful Improvements in Speed-Controlling and Reversing Apparatus for Motor-Vehicles; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one form in which I have contemplated embodying my invention, and said invention is fully disclosed in the following description and claims.

Referring to the said drawings, Figure 1 is a sectional view of a speed controlling and reversing apparatus for motor vehicles, embodying my invention. Fig. 2 is a plan view of the guiding plate for the shifting lever, shown in Fig. 1. Fig. 3 is a detail sectional view on line 3—3 of Fig. 2. Fig. 4 is a similar sectional view on line 4—4 of Fig. 2. Fig. 5 is an enlarged horizontal section on line 5—5 of Fig. 1. Fig. 6 is an enlarged diagrammatic view of the gearing within the gear casing showing it spread out, in order that the relative arrangement and coöperation of the parts may be more clearly understood. Fig. 7 is a vertical transverse sectional view on line 7—7, Fig. 1. Fig. 8 is a similar section on line 8—8, Fig. 1. Fig. 9 is a detail view of a part of the mechanism.

In the accompanying drawings A represents a gear case, suitably supported in the vehicle, and containing the change speed and reversing gearing.

B, B' represent the main drive shaft, which extends through bearings $a$, $a$ in the ends of the gear case, and is divided within the case at $b$, the two parts being held in axial alinement. The section B of the main shaft extends to the motor, to which it is preferably connected by the usual friction or other clutch mechanism (not shown) in a well known manner. The section B' of the main shaft extends to the mechanism where the power is applied, as to the axle or axles through the usual differential gear, in any desired manner. Viewing the transmission mechanism here shown by itself, the shaft section B is the driving shaft and the section B' is the driven shaft.

Upon the driving section B, I mount a plurality of pinions or gears, and a clutch member for clutching the two sections B and B' together. In this instance I provide the driving section B with a casting C provided with the pinions C', C² and the gear wheel C³, which are thus formed integrally, the said casting C being keyed or otherwise rigidly secured to the shaft section B. The casting C is so placed on the section B as to project beyond the inner end of the same and form a bearing or socket for the adjacent end of shaft section B' as shown.

C⁴ represents one member of a clutch (preferably a dog clutch) which is formed on the face of the gear C³, and forms preferably an integral part of the casting C.

The shaft section B' is provided with a clutch member C⁵ adapted to engage the clutch member C⁴ and with a beveled pinion C⁶, said parts being preferably formed integrally as shown, forming a casting C⁷, which is provided in this instance with a square central aperture and is arranged to slide on a squared portion $b'$ of the shaft section B'. The casting C⁷ is provided with an annular groove to receive a yoke for giving it the desired reciprocation on the shaft section.

At opposite sides of, and slightly above the level of the shaft B, B' are stationary shafts or bars D, and E which are arranged parallel with the shaft B, B' and have their ends clamped or secured to the end walls of the gear case. I prefer to provide said end walls with stationary brackets $a'$ and detachable caps $a^2$, secured to said brackets by screws and constructed to receive and hold the lateral shafts D and E as shown. Upon the shaft D is mounted a loose sleeve D⁴ carrying the reversely beveled pinions D' and D² and gear wheel D³ and on the shaft E is loosely mounted sleeve E³ provided with bevel pinion E', and gear wheel E².

In order to economize room within the gear casing, I provide what I term a saddle, shown in detail in Fig. 9 which comprises a forging F having a bearing aperture therein for the main shaft section B' and a depending stud $f$, and two diverging upwardly extending studs $f'$ $f^2$. The stud $f$ extends into a socket $a^3$ located in the bottom of the casing, the stud $f'$ carries a sleeve G provided with a beveled pinion G', adapted to mesh with the beveled pinion $C^6$ on the shaft section $B'$, and a beveled gear $G^2$ adapted to engage the beveled pinion $E'$, and the outer end of stud $f'$ enters a recess in a forging $F'$ provided with an aperture through which the rod or dead shaft $E$ passes, and which has a lateral stud $f^3$ which is firmly clamped to the side of the gear casing, by means of a bracket and detachable cap as shown, or other desired manner. The stud $f^2$ of the forging $F$ is provided with a loose sleeve $H$ carrying a beveled pinion $H'$ adapted to mesh with the pinion $C^6$, and a beveled gear $H^2$ adapted to engage one or other of beveled pinions $D'$, $D^2$, and the end of the stud $f^2$ enters a recess in a forging $F^2$ having a hole fitting the sleeve $D^4$, and a lateral stud $f^4$ clamped or otherwise secured to the side of the gear casing. The three parts of the "saddle" $F$, $F'$ and $F^2$ may be made of castings if preferred, and said parts are preferably secured rigidly together by pins, or otherwise.

For conveniently shifting the movable parts of the transmission mechanism, I employ preferably three sliding rods $L'$, $L^2$, $L^3$ each of which is provided with a suitable yoke. The yoke $l'$ of rod $L'$ engages the sleeve $D^4$, the yoke $l^2$ of the center rod $L^2$ engages the casting $C^7$, and the yoke $l^3$ of rod $L^3$ engages the sleeve $E^3$.

The transmission mechanism as herein shown and described provides for driving the driven shaft section $B'$ in one direction at three different speeds, and for driving in the reverse direction at one speed only. These changes of gearing are accomplished in the following manner. To drive at the lowest speed forward or in the same direction as the driving section or member $B$, (which will be supposed to rotate in the direction indicated by the arrow 1 in Fig. 6,) the slide rod $L$ is operated so as to move the sleeve $D^4$ in the direction of the arrow 2, Fig. 6, thus bringing gear wheel $D^3$ into mesh with pinion $C^2$, and forcing beveled pinion $D'$ into mesh with the beveled gear $H^2$. The motion will then be imparted from driving shaft section $B$, through the reducing train comprising wheels $C^2$, $D^3$, $D'$, $H^2$, $H'$ to bevel pinion $C^6$, on the driven section $B'$, which will be rotated in the same direction as the driving member $B$, but at lower speed.

To secure an intermediate speed, the parts previously mentioned are restored to normal position by rod $L'$ and rod $L^3$ is shifted to bring the gear $E^2$ into mesh with the gear $C^3$, and bevel pinion $E'$ into mesh with bevel gear $G^2$ (see arrow 3) thus connecting the shaft section $B$ through an intermediate reducing train including wheels $C^3$, $E^2$, $E'$, $G^2$, $G'$ with bevel pinion $C^6$, and driving shaft $B'$ in the same direction as shaft $B$, but slower. This train gives an increased speed, however, over the first mentioned train.

To drive the shaft section $B'$ at highest speed the parts just mentioned are restored to normal position by rod $L^3$, and the central rod $L^2$ is shifted, to move the sleeve or casting $C^7$ in the direction of arrow 4, thus moving bevel pinion $C^6$ out of gear with bevel pinions $H'$ and $G'$ and bringing the members $C^4$, $C^5$ of the clutch together. This causes the two shafts to move together in the same direction and at the same speed. It is to be noted that when the shaft $B'$ is driven at highest speed, none of the other pinions or gear wheels are in operation, and all useless wear upon them is thus prevented.

In order to reverse the shaft $B'$, the rod $L'$ is moved in a direction opposite to that previously described, so as to shift the sleeve $D^4$ in the direction of the arrow 5, and bring gear $D^3$ into mesh with pinion $C'$, and bevel pinion $D^2$, in mesh with bevel gear $H^2$, thus transmitting motion at reduced speed and in reverse direction to the pinion $C^6$, which will have been restored to its normal position in mesh with pinions $H'$, $G'$.

It will also be seen that only a short movement is required in effecting any of these gear changes, such movement not exceeding materially the width of the pinions and gears. It will also be seen that in effecting the lowest and intermediate gear connections the pinions $D^3$ or $E^2$ are first moved into engagement with their appropriate pinions or gears before the adjacent bevel pinion engages its bevel wheel (thus preventing the strain on the gear teeth) and when these gears are well in mesh the beveled wheels are thrown into mesh. This arrangement effectually prevents the stripping of teeth. I also prefer to provide the bearings $a$ $a$ through which the shaft sections $B$ $B'$ extend with gaskets as shown at $a^4$ $a^4$, (see Fig. 1) to make the bearing apertures liquid tight and the gear or transmission case $A$ is preferably filled with oil up to the level of the rods $L'$, $L^2$, $L^3$ so that the gears and pinions will be at all times in a bath of oil to insure perfect lubrication. If desired the gear case $A$ may be entirely filled with oil, in which case the apertures through which the rods $L$, $L'$, $L^2$ extend will also be provided with hydraulic washers or with stuffing boxes (not shown) to render them liquid tight.

It is obvious that the gear changes herein enumerated may be effected in many ways by suitable levers or connections, and I desire to cover the transmission mechanism herein shown and described irrespective of any particular form of operating mechanism. I have however perfected a mechanism for operating this transmission mechanism by means of a single lever, which mechanism is so constructed and arranged as to permit the operator to select the desired combination of gears, and throw such combination into gear directly without "passing through" other combinations, insuring the proper action of the parts at all times and at the same time locking out of operation the controlling devices for the combinations not selected, and locking in operation the selected gearing. This special control mechanism is claimed herein in combination with my improved transmission gearing, but as it is susceptible of use with other forms of transmission mechanism I have made this control mechanism by itself the subject of another application and it will not, therefore, be specifically claimed herein.

At some suitable point in the vehicle I arrange a vertically disposed lever M which is pivoted between its ends universally. In this instance I have shown, (Figs 1 and 7) said lever mounted on a pivot $m$ in a block $m'$ having horizontal trunnions $m^2$ extending perpendicularly to the pivot $m$ and engaging apertures in a suitable supporting casing $M'$, to which they are secured by nuts as shown, thus enabling the upper end of the lever to be moved both laterally and back and forward. Each of the rods $L'$, $L^2$, $L^3$ (or extensions thereof) is provided with a vertically extending arm or lug having its upper end rounded or partly cylindrical, the said lugs being shown at $l^4$, $l^5$, $l^6$, and being connected to rods $L'$, $L^2$, $L^3$ respectively. The lower end of lever M is provided with a yoke $m^3$ of a width equal to or less than that of one of said lugs, so that either one of the three lugs may be selected by means of said lever, by moving it laterally while a backward or forward movement of the lever will actuate one only of said rods, to wit, the one selected, longitudinally.

At the upper end of the casing $M'$ is a guiding and indicating plate N curved concentrically with the trunnions $m^2$, and provided with a transverse slot $n$, from the opposite ends of which two slots $n'$ $n^2$ extend forwardly, while from the center a slot $n^3$ extends rearwardly, and an additional slot $n^4$ extends rearwardly in line with the slot $n'$ (see Fig. 2). The slot $n'$ indicates the position of the lever M for the first, or slowest speed, slot $n^2$ the position of the lever for the second or intermediate speed, slot $n^3$ the position for high speed and slot $n^4$ the position for the reverse. When the lever is in any part of the transverse slot $n$, its position is neutral, and no gears are engaged, and it is so illustrated in Fig. 1. In order to prevent the operator from pulling the lever out of slot $n'$, directly into reverse by accident, I provide a lock-out plate $N'$ pivoted to the plate N at one side of the slot $n^4$ and having its forward edge in line with the rear edge of slot $n$. This lock-out plate is normally held in the position shown, as hereinafter described. A similar lock-out plate $N^2$ is provided for the first speed slot $n'$, and means are provided for connecting said lock-out plates so that when one is down in operative position the other is always raised. In this instance I have shown the hinge member of each lock-out plate (Figs. 2, 3 and 4) provided with a downwardly extending stud $n^5$, extending through a slot in the plate N, and said studs engage slots in the opposite ends of a lever $n^6$, pivoted at $n^7$ below said plate N, thus securing the result described. A spring $n^8$ bearing against said lever $n^6$, holds it normally in the position shown in the drawings. The lever M is provided with a vertically movable collar, O provided with locking pawls $o$ $o$ extending forwardly and rearwardly therefrom to engage suitable detents provided in connection with plate N, so that the lever M can be locked in any position to which it may be moved, against accidental displacement. The collar O is connected by a link $O'$ with a pawl lever $O^2$ arranged adjacent to the hand portion $M^3$ of lever M so that the pawls $o$ $o$ can be raised when the handle is grasped.

The detents referred to are arranged as follows: a detent $o'$ being at the outer end of slot $n'$, for locking the lever into first speed, and a detent $o^2$ on top of lock-out plate $N'$ to lock the lever on coming out of said slot. A detent $o^3$ is located at the outer end of slot $n^2$ and a detent $o^4$ adjacent to its inner end, detent $o^5$ and $o^6$ at opposite ends of slot $n^3$, a detent $o^7$ at the outer end of slot $n^4$ for the reverse and a coöperating detent $o^8$ on the lock-out plate $N^2$.

I also provide means for positively preventing the operation of any of the rods $L'$, $L^2$, $L^3$ except the one selected. At the lower end of the casing $M'$ I arrange a laterally movable plate P, mounted in guides $p$ $p$ extending transversely of the rods $L'$, etc., and provided with a longitudinal central slot $p'$ (see Fig. 5) just wide enough to permit the movement therethrough of the yoke $m^3$, and one of the lugs on the gear shifting rods. Plate P is also provided with a lateral slot $p^2$ which embraces the heads of all of said lugs $l^4$, $l^5$, $l^6$ and is, therefor too narrow to admit the yoke $m^3$. The slot $p^2$ is of sufficient length to accommodate two of the lugs $l^4$, $l^5$, $l^6$ on each side of the longitudinal slot $p'$. I also provide means for preventing the shifting of the lever M laterally, to change the speed of the gearing, until after the ordinary clutch, with which all motor vehicles are provided, has been disconnected. In this instance R represents the foot lever controlling the clutch between the engine and shaft B (not shown) which lever is moved by the foot of the operator in the direction of the arrow, Fig. 1, to disconnect the clutch, thus disconnecting the engine or motor from shaft B. The clutch lever is moved in the direction to throw the clutch in by a spring (not shown) as usual in such cases.

The plate P is provided with a series of holes $p^3$, $p^4$, $p^5$, arranged in a transversely disposed line beneath a locking bolt S, preferably pressed downwardly by a spring s into engagement with one or the other of the holes in the plate P and said bolt is connected by a chain r, or other connection with clutch lever R. It follows from this construction that when the lever M has been moved into position to select a particular speed, the application of the clutch will permit the bolt S to enter one of the holes in the plate P and lock it and lever M against lateral movement. The lever cannot, thereafter be shifted laterally until the operator presses the clutch lever R forward, thereby releasing the bolt S from plate P.

The operation of the parts described will be as follows. Supposing that the operator desires to start a car from a standstill, the clutch being disconnected, he seizes the handle of lever M and throws it to the right into line with slot $n'$, then forward into said slot where it will be locked by releasing the pawl lever $O^2$. As the lever M is moved to the right its lower end will move to the left, carrying with it plate P, until the yoke $m^3$ engages lug $l^4$ of the rod $L'$; the forward movement of the handle causes the lug $l^4$ and rod $L'$ to move rearwardly (the lugs $l^5$ and $l^6$ being locked in the right hand part of slot $p^2$, and held from movement). This draws the sleeve $D^4$ in the direction of the arrow 2, as before described and sets the train for the lowest or first speed. After starting the car and gaining momentum, the operator can by throwing out the clutch go to second speed, or directly to the third, or highest speed, as preferred, by throwing out the clutch, moving the handle laterally to slot $n^3$ or slot $n^4$ and forward or rearward as required by the slots, the yoke $m^3$ of lever M selecting the required rod and moving it in the required direction. In going to reverse the operator must first throw up the lock-out plate $N'$, thus throwing down the plate $N^2$, when a lateral and rearward movement of the hand lever will put the reverse gearing in operative relation.

It will be seen that each time a gear train is selected and out into operative condition, all parts are restored to inoperative or normal position by simply throwing the hand lever back to the neutral position in slot $n$, before any other speed can be selected. Again in throwing the lever M out of geared position it will be instantly stopped in the neutral position by the opposing edge of slot $n$ or by one of the lock-out plates $N'$, $N^2$ as will be readily understood.

The operator is free at all times to select any of the speeds, or reverse, and proceed directly to it without "passing through" other gear connections thus rendering the control extremely elastic. Again the distance that the hand lever M is moved from neutral to "in gear" position is a very short one, not exceeding two or three inches, so that the changes can be made very quickly and without taking the attention of the operator from the steering wheel or causing him to lean materially in any direction.

What I claim and desire to secure by Letters Patent is:—

1. The combination with axially alined driving and driven shaft sections, of a plurality of gears on the driving section, auxiliary shafts supported parallel to and stationarily with respect to the alined shafts, a sliding gear on each of said auxiliary shafts, normally out of operative relation with any of the gears on the driving section, means for connecting each of said sliding gears with a gear on the driving section and means for connecting each of said sliding gears with the driven section, substantially as described.

2. The combination with axially alined driving and driven shaft sections, of a plurality of gears on the driving shaft section, auxiliary shafts supported parallel to and stationarily with respect to the alined shafts, a sliding member on each of said auxiliary shafts, normally out of operative relation with any of the gears on the driving section, and means for simultaneously connecting each of said sliding members with a gear on the driving shaft, and with a gear on the driven shaft, substantially as described.

3. The combination with axially alined driving and driven shaft sections, of a plurality of gears on the driving section, auxiliary shafts supported parallel to and stationarily with respect to the alined shafts, a sliding gear on each of said auxiliary shafts normally out of operative relation with any of the gears on the driving shaft section, gearing connections extending from the driven shaft to points adjacent to the auxiliary shafts, said sliding gears being provided each with means for operatively engaging said gear connections, and means for independently shifting said sliding gears simultaneously into operative engagement with one of said gear connections and with a gear on the driving shaft section, substantially as described.

4. The combination with axially alined driving and driven shaft sections, of a plurality of gears on the driving section, auxiliary shafts supported parallel to and stationarily with respect to the alined shafts, a sliding gear on each of said auxiliary shafts, normally out of operative relation with any of the gears on the driving section, means for connecting each of said sliding gears with a gear on the driving section, means for independently connecting each of said sliding gears with a gear on the driving shaft section, and a clutch for directly connecting the driving and driven shaft sections, substantially as described.

5. The combination with axially alined driving and driven shaft sections, of a plurality of gears on the driving section, auxiliary shafts supported parallel to and stationarily with respect to the alined shafts, a sliding gear on each of said auxiliary shafts, normally out of operative relation with any of the gears on the driving section, means for connecting each of said sliding gears with a gear on the driving section, means for independently connecting each of said sliding gears with a gear on the driven shaft section, a clutch for directly connecting the driving and driven shaft sections, and means for disconnecting the connections between the driven shaft and the sliding gears, simultaneously with the operation of said clutch, substantially as described.

6. The combination with axially alined driving and driven shaft sections, of a plurality of gears on the driving section, auxiliary shafts supported parallel to and stationarily with respect to the alined shafts, a sliding gear on each of said auxiliary shafts normally out of operative relation with any of the gears on the driving shaft section, gearing connections extending from the driven shaft to points adjacent to the auxiliary shafts, said sliding gears being provided each with means for operatively engaging said gear connections, means for independently shifting said sliding gears simultaneously into operative engagement with one of said gearing connections and with a gear on the driving shaft section, means for disconnecting said gearing connections from the driven shaft, and a clutch for directly connecting the alined driving and driven shaft sections, operative simultaneously with the operation of said disconnecting means, substantially as described.

7. The combination with axially alined driving and driven shaft sections, of a plurality of gears on the driving section, two auxiliary shafts supported parallel to and stationarily with respect to said alined shafts, a sliding driven gear on the driven shaft section, gear connections extending from the driven gear to points adjacent to each of the auxiliary shafts, sliding gears on each of the auxiliary shafts, normally out of engagement with the gears on the driving shaft section and provided with means, normally out of operative position for operatively engaging said gear connections for the driven gear, means for independently shifting said sliding gears, to place either of them in operative relation with a gear on the driving shaft section and with one of said gear connections with the driven shaft, a clutch normally out of operative position for directly connecting the driving and driven shaft sections, and connections between said driven gear and said clutch whereby the movement of said clutch into operative position will move said driven gear into inoperative position, substantially as described.

8. The combination with axially alined driving and driven shaft sections, a driving gear on said driving section, a driven bevel gear movable on said driven section, an auxiliary shaft supported stationarily parallel to the alined shafts, transversely disposed connected bevel gears, one of which is adapted to be engaged by said driven gear, a sliding gear on said auxiliary shaft adapted to be moved into engagement with the driving gear, and a bevel gear connected with and movable with said sliding gear, and adapted to be moved into engagement with one of said transverse bevel gears when the sliding gear is moved into operative position, and a clutch for directly connecting the driving and driven shaft sections, substantially as described.

9. The combination with axially alined driving and driven shaft sections, driving gears on said driving section, a driven bevel gear on the driven section, an auxiliary shaft stationarily supported parallel to the alined shafts, transversely disposed connected bevel wheels between the driven shaft and auxiliary shaft, one of which is adapted to be engaged by the driven gear, a sliding gear on the auxiliary shaft located between the driving gears and movable into engagement with either, a pair of opposed bevel gears on said auxiliary shaft, arranged on opposite sides of one of said transverse bevel gears, said pair of bevel gears being connected to and movable with the sliding gear on the auxiliary shaft, substantially as described.

10. The combination with axially alined driving and driven shaft sections, driving gears on said driving section, a driven bevel gear on the driven section, an auxiliary shaft stationarily supported parallel to the alined shafts, transversely disposed connected bevel wheels between the driven shaft and auxiliary shaft, one of which is adapted to be engaged by the driven gear, a sliding gear on the auxiliary shaft located between the driving gears and movable into engagement with either, a pair of opposed bevel gears on said auxiliary shaft, arranged on opposite sides of one of said transverse bevel gears, said pair of bevel gears being connected to and movable with the sliding gear on the auxiliary shaft, means for moving the driven gear into and out of operative relation with the adjacent transverse bevel gear, and a clutch for directly connecting said driving and driven shaft sections, substantially as described.

11. The combination with alined driving and driven shaft sections, a plurality of driving gears on said driving section, a driven bevel gear on said driven section, stationarily supported auxiliary shafts located on opposite sides of and parallel to the alined shafts, a pair of transversely disposed connected bevel gears on each side of the driven shaft, the inner gears of said pairs being in position to engage the driven gear, a sliding gear on each of said auxiliary shafts, movable into engagement with a gear on the driving section, a bevel gear on one of said auxiliary shafts, connected to and movable with the sliding gear thereon, and adapted to be moved into engagement with the outer bevel gear of the adjacent transverse pair, and a pair of opposed bevel gears on the other auxiliary shaft, connected to and movable with the sliding gear thereon and arranged on opposite sides of the outer bevel gear of the adjacent transverse pair, substantially as described.

12. The combination with alined driving and driven shaft sections, a plurality of driving gears on said driving section, a driven bevel gear on said driven section, stationarily supported auxiliary shafts located on opposite sides of and parallel to the alined shafts, a pair of transversely disposed connected bevel gears on each side of the driven shaft, the inner gears of said pairs being in position to engage the driven gear, a sliding gear on each of said auxiliary shafts, movable into engagement with a gear on the driving section, a bevel gear on one of said auxiliary shafts, connected to and movable with the sliding gear thereon, and adapted to be moved into engagement with the outer bevel gear of the adjacent transverse pair, and a pair of opposed bevel gears on the other auxiliary shaft, connected to and movable with the sliding gear thereon and arranged on opposite sides of the outer bevel gear of the adjacent transverse pair, means for moving the driven bevel gear into and out of engagement with the adjacent transverse bevel wheels, and a clutch for directly connecting the alined shaft sections, substantially as described.

In testimony whereof I affix my signature, in the presence of two witnesses.

HARRY T. COLDWELL.

Witnesses:
ABNER L. MOFFET,
A. W. MAPES.